United States Patent [19]

Kohno

[11] Patent Number: 4,760,441
[45] Date of Patent: Jul. 26, 1988

[54] SOLID-STATE COLOR IMAGING APPARATUS HAVING COLOR FILTER ARRAY WHICH ELIMINATES VERTICAL COLOR ERROR

[75] Inventor: Akiyoshi Kohno, Tokyo, Japan

[73] Assignee: NEC Corporation, Tokyo, Japan

[21] Appl. No.: 49,025

[22] Filed: May 13, 1987

Related U.S. Application Data

[63] Continuation of Ser. No. 908,871, Sep. 15, 1986, abandoned, which is a continuation of Ser. No. 671,087, Nov. 13, 1984, abandoned.

[30] Foreign Application Priority Data

Nov. 10, 1983 [JP] Japan .................... 58-211184

[51] Int. Cl.$^4$ .................... H04N 9/077; H04N 9/07
[52] U.S. Cl. .................... 358/44; 358/43
[58] Field of Search .................... 358/41, 43, 44, 47, 358/48

[56] References Cited

U.S. PATENT DOCUMENTS

| | | | |
|---|---|---|---|
| 4,064,532 | 12/1977 | Yamanaka | 358/44 |
| 4,437,112 | 3/1984 | Tanaka et al. | 358/44 |
| 4,652,911 | 3/1987 | Teranishi et al. | 358/44 |

FOREIGN PATENT DOCUMENTS

| | | | |
|---|---|---|---|
| 53-79433 | 7/1978 | Japan | 358/44 |
| 53-79435 | 7/1978 | Japan | 358/44 |
| 56-158586 | 12/1981 | Japan | 358/44 |
| 57-212888 | 12/1982 | Japan | 358/44 |
| 58-211718 | 12/1983 | Japan | 358/44 |

*Primary Examiner*—James J. Groody
*Assistant Examiner*—Randall S. Svihla
*Attorney, Agent, or Firm*—Burns, Doane, Swecker & Mathis

[57] ABSTRACT

A solid-state color imaging apparatus includes an array of color filters. The first and third rows of the array are constructed entirely of same-color filters. The second row of the array comprises a first set of color filters for generating a first color difference signal component modulated with a predetermined number of picture elements forming one cycle in the horizontal direction, and the fourth row comprises a second set of color filters which generates a second color difference signal component modulated with a predetermined number of picture elements forming one cycle in the horizontal direction. In one embodiment, the same-color filters of the first and third rows are transparent to red, green and blue light. In another embodiment, the same-color filters transmit green light and attenuate the intensity of blue and red light so that intensity of the transmitted blue and red light is half the intensity of the incident blue and red light, respectively, thereby to approximate the spectral characteristics of a luminance signal of an NTSC color television signal. A color difference signal component is not included in the odd-numbered horizontal rows but only in the even-numbered horizontal rows whereby vertical color error is not generated in the color difference signal in the output signal even when the horizontal picture elements in the adjacent rows have no vertical correlation. Thus, the color difference signal included in the output signal from the color imaging apparatus is formed from a single horizontal picture element row to provide a color television signal without generating vertical color error.

5 Claims, 8 Drawing Sheets

EVEN-FIELD  ODD-FIELD

FIG. 3
PRIOR ART

| | | | | | | |
|---|---|---|---|---|---|---|
| Ye | Cy | Ye | Cy | Ye | Cy | $l_1$ |
| Mg | G | Mg | G | Mg | G | $l_2$ |
| Ye | Cy | Ye | Cy | Ye | Cy | $l_3$ |
| G | Mg | G | Mg | G | Mg | $l_4$ |
| Ye | Cy | Ye | Cy | Ye | Cy | $l_5$ |
| Mg | G | Mg | G | Mg | G | $l_6$ |
| Ye | Cy | Ye | Cy | Ye | Cy | $l_7$ |
| G | Mg | G | Mg | G | Mg | $l_8$ |

| W | W | W | W | W | W | $l_1$ |
| G | Mg | G | Mg | G | Mg | $l_2$ |
| W | W | W | W | W | W | $l_3$ |
| Ye' | Cy' | Ye' | Cy' | Ye' | Cy' | $l_4$ |
| W | W | W | W | W | W | $l_5$ |
| G | Mg | G | Mg | G | Mg | $l_6$ |
| W | W | W | W | W | W | $l_7$ |
| Ye' | Cy' | Ye' | Cy' | Ye' | Cy' | $l_8$ |

| | | | | | | |
|---|---|---|---|---|---|---|
| Y | Y | Y | Y | Y | Y | $l_1$ |
| G | Mg | G | Mg | G | Mg | $l_2$ |
| Y | Y | Y | Y | Y | Y | $l_3$ |
| Ye' | Cy' | Ye' | Cy' | Ye' | Cy' | $l_4$ |
| Y | Y | Y | Y | Y | Y | $l_5$ |
| G | Mg | G | Mg | G | Mg | $l_6$ |
| Y | Y | Y | Y | Y | Y | $l_7$ |
| Ye' | Cy' | Ye' | Cy' | Ye' | Cy' | $l_8$ |

SOLID-STATE COLOR IMAGING APPARATUS HAVING COLOR FILTER ARRAY WHICH ELIMINATES VERTICAL COLOR ERROR

This application is a continuation of application Ser. No. 908,871, filed Sept. 15, 1986, now abandoned, which is a continuation of Ser. No. 671,087, filed Nov. 13, 1984, now abandoned.

BACKGROUND OF THE INVENTION

This invention relates to a solid-state color imaging apparatus.

An interline transfer CCD imaging element (hereinbelow, abbreviated to "IL-CCD imaging element") comprises a plurality of picture elements arrayed regularly in both a horizontal direction and a vertical direction. Vertical CCD registers transfer, in the vertical direction, signal charges which are photoelectrically converted by and stored in the picture elements. At the ends of the vertical column, a horizontal CCD register transfers them in the horizontal direction to an output portion.

The IL-CCD imaging element is capable of two sorts of read-out operations which are a frame storage operation in which the signal charges stored in the picture elements are read out during every frame period, and a field storage operation in which they are read out during every field period. The field storage operation requires a half of the frame storage time, and gives a lesser feeling of afterimage. For this reason, the development of a single-plate color imaging device for effecting the field storage operation is being promoted.

In color imaging by the use of the IL-CCD imaging element, the color separated images of a subject are formed by color filters. The color separated images are picked up by the IL-CCD imaging element. The output signals of the IL-CCD imaging element are processed, thereby to obtain chrominance and luminance signals.

A conventional IL-CCD imaging apparatus having a conventional color filter has a disadvantage, to be described below. The signal of each horizontal line is a sum of the signal charges obtained by independently and spatially sampling the two adjacent picture elements in the vertical direction and is not constituted by a single horizontal line signal. This causes a very large vertical color error in the output signal of the conventional imaging apparatus when the apparatus picks up a subject having a vertical repetition frequency equal to one half of the number of the vertical picture elements, that is, a sharp vertical contour portion having no vertical correlation between two adjacent horizontal picture element rows.

OBJECTS AND BRIEF SUMMARY OF THE INVENTION

It is, therefore, an object of this invention to provide a solid-state color imaging apparatus capable of producing faithful output signals even when a sharp vertical contour portion having no vertical correlation is picked up.

According to to this invention, there is provided a solid-state color imaging apparatus having improved color filter. The color filter has a recurrence cycle of four picture elements in the vertical direction. In first and third rows, same filters are arrayed for generating same signal component from each picture elements. In a second row, first set of color filters are arrayed for generating a first color difference signal component modulated with a predetermined number of picture elements forming one cycle in the horizontal direction. In a fourth row, a second set of color filters are arrayed for generating a second color difference signal component modulated with a predetermined number of picture elements forming one cycle in the horizontal direction.

BRIEF DESCRIPTION OF THE DRAWINGS

The features and advantages of this invention will be understood from the following detailed description of preferred embodiments, taken in conjunction with the accompanying drawings, wherein.

First, a conventional CCD color imaging apparatus will be described with reference to FIGS. 1 through 6.

A conventional IL-CCD imaging element (FIG. 1) comprises picture elements 1 arrayed regularly in a horizontal direction and a vertical direction. Vertical CCD registers 2 transfer, in the vertical direction, signal charges which are photoelectrically converted by and stored in the picture elements 1. At the ends of the vertical columns, a horizontal CCD registers 3 transfers them in the horizontal direction, to an output portion 4. Arrows are used in FIG. 1 to indicate the transfer directions of the signal charges.

Figure 1:
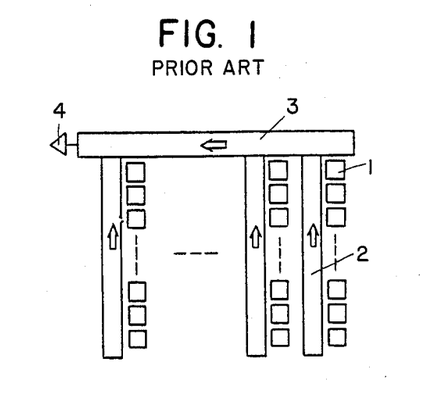
FIG. 1 is a schematic view of an interline transfer CCD imaging element.
Figure 2:
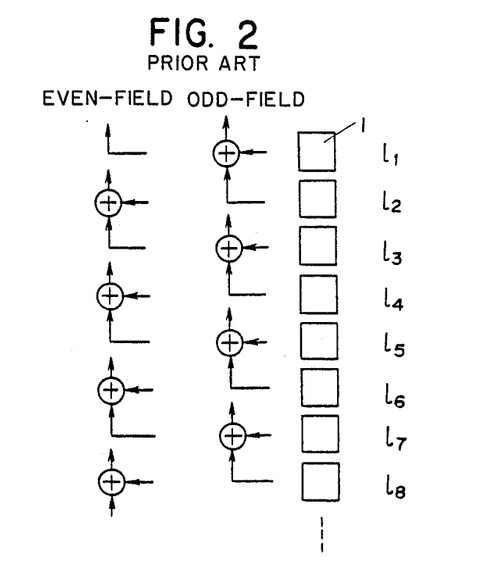
FIG. 2 is a diagram schematically showing the read-out of signal charges in the interline transfer CCD imaging element in a field storage mode.

FIG. 2 schematically illustrates the field storage operation. Rows in the horizontal direction are successively marked 11, 12, 13, 14, - - - 18, - - - begining with a certain row. In odd-numbered fields, the signal charges are first transferred to the vertical CCD registers 2 from the picture elements corresponding to lines or rows 12, 14, 16, 18, - - - . The signal charges corresponding to one picture element are substantially transferred by operation of each vertical CCD register 2. Further, the signal charges are transferred to the vertical CCD registers 2 from the picture elements corresponding to lines or rows 11, 13, 15, 17, - - - . As a result, the signal charges of the picture elements corresponding to lines or rows 12, 14, 16, 18, - - - are respectively added with the signal charges of the picture elements corresponding to lines or rows 11, 13, 15, 17, - - - in the vertical CCD registers 2. The signal charges of each of the lines or rows 11+12, 13+14, 15+16, 17+18, - - - are added and used as a signal for one horizontal period.

In even-numbered fields, the combinations of the rows of the picture elements in the horizontal direction which are to be added in the vertical CCD registers 2 are changed into lines or rows 12+13, 14+15, 16+17, - - - . The combinations of the two respectively adjacent rows in the vertical direction are changed every field, in this manner, thereby performing an interlaced operation.

In color imaging by the use of the IL-CCD imaging element, as stated above, the color separated images of a subject are formed by color filters. The outputs signals of the IL-CCD imaging element are processed, to obtain chrominance signals and luminance signals.

Figure 3:
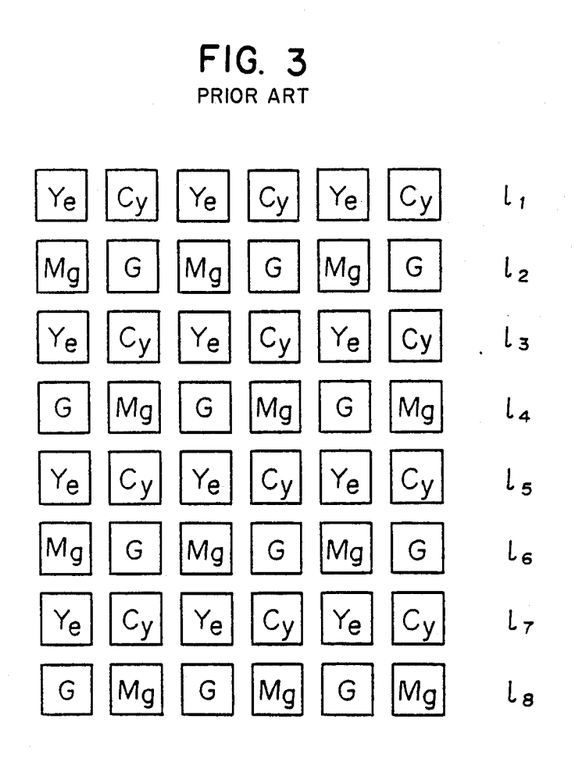
FIG. 3 is a schematic partial plan view showing the arrangement of color filters and the mutual relationships between the color filters and picture elements in a conventional color imaging apparatus.

FIG. 3 is a schematic partial plan view showing the color arrangement of the color filters as used in a conventional single-plate color imaging apparatus of the field storage operation also showing the mutual relationships between the color filters and the picture elements.

Referring to FIG. 3, the plurality of picture elements 1 are regularly arranged in the horizontal direction and in the vertical direction. The color filters are formed on the respective picture elements 1. The letters Ye, Cy, Mg and G indicate the color filters for yellow, cyan, magenta and green, respectively. The yellow color filter transmits red and green light, the cyan color filter transmits blue and green light, and the magenta color filter transmits red and blue light. The color filters are arrayed with two picture elements forming one cycle in the horizontal direction and with four picture elements forming one cycle in the vertical direction. The rows in the horizontal direction are identified as lines or rows 11, 12, 13, - - - , 18, - - - successively from a certain row. From the left toward the right in the horizontal direction, filters Ye and Cy are alternately and repeatedly arranged in the horizontal rows 11 and 15; filters Mg and G are alternately arranged in the next rows 12 and 16; filters Ye and Cy in the next 13 and 17; and filters G and Mg in the next rows 14 and 18.

Figure 4:
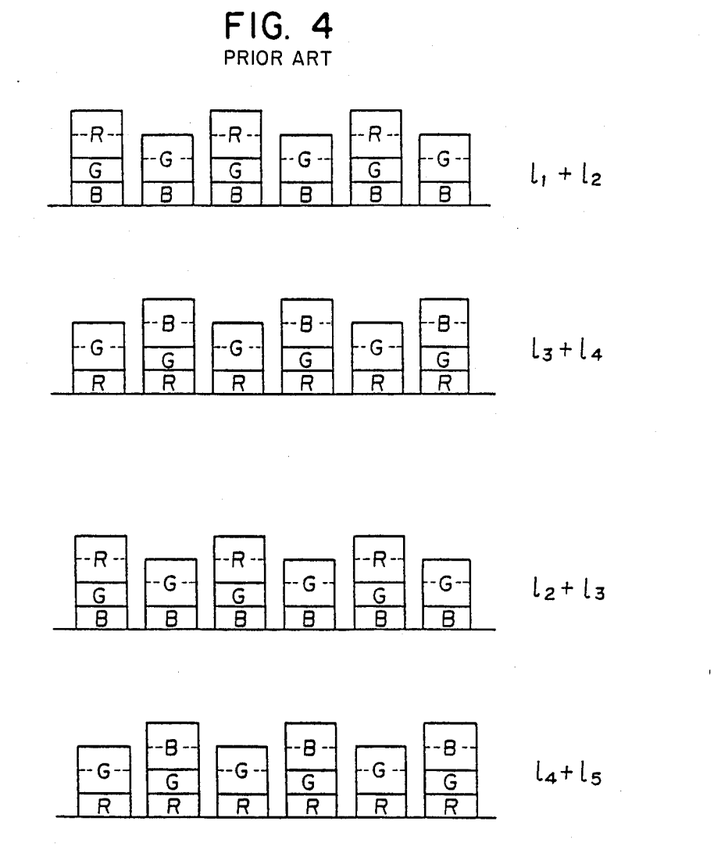
FIG. 4 is a diagram schematically showing the outputs of respective color signals from an interline transfer CCD imaging element which is furnished with the color filters in FIG. 3.

FIG. 4 is a diagram schematically showing the magnitude of the outputs of the color signals from the respective picture elements, formed with the aforementioned color filters, in the case of the field storage operation. These color signals result from an array of filters, as shown in FIG. 3. The letters B, G and R respectively denote a blue signal, a green signal and a red signal, having a respective ratio of 1:1:1. As illustrated in FIG. 4, when the output signals are averaged, R+3/2G+B is obtained. This combination of signals is used as the luminance signal. Color difference signals are alternately (every one horizontal line) superposed as modulation components $(R-\frac{1}{2}G)\cos wt$ and $(B-\frac{1}{2}G)\cos wt$ with two picture elements forming one cycle in the horizontal direction. Here, w denotes an angular frequency which corresponds to the cycle of two picture elements. The output signals $S(l1+l2)$ and $S(l3+l4)$ of lines or rows 11+12 and 13+14 are indicated by the following equation.

$$S(l1 + l2) = (B + 2G + R - B\cos wt + R\cos wt)/2 + $$
$$(B + G + R + B\cos wt + R\cos wt - $$
$$G\cos wt)/2$$
$$= B + 3/2G + R + (R - 1/2G)\cos wt$$

$$S(l3 + l4) = (B + 2G + R - B\cos wt + R\cos wt)/2 + $$
$$(B + G + R - B\cos wt - R\cos wt + $$
$$G\cos wt)/2$$
$$= B + 3/2G + R - (B - 1/2G)\cos wt$$

Figure 5:
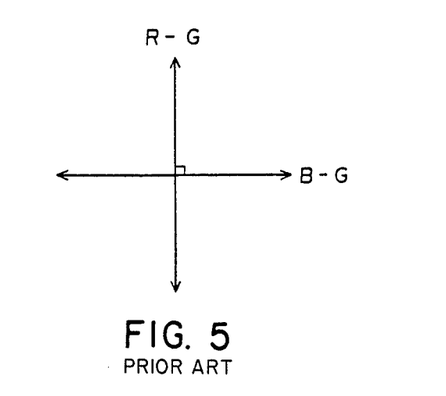
FIG. 5 is a diagram showing a color difference vector.

The NTSC color television signal can be constituted by using (B+3/2G+R) as the luminance signal, and the modulation components $(R-\frac{1}{2}G)$ and $(B-\frac{1}{2}G)$ as two orthogonal color difference signals as shown in FIG. 5. The signals of the even-numbered fields are similarly constituted, because the signals $S(l2+l3)$ and $S(l4+l5)$ are same as the signals $S(l1+l2)$ and $S(l3+l4)$, respectively.

Figure 6:
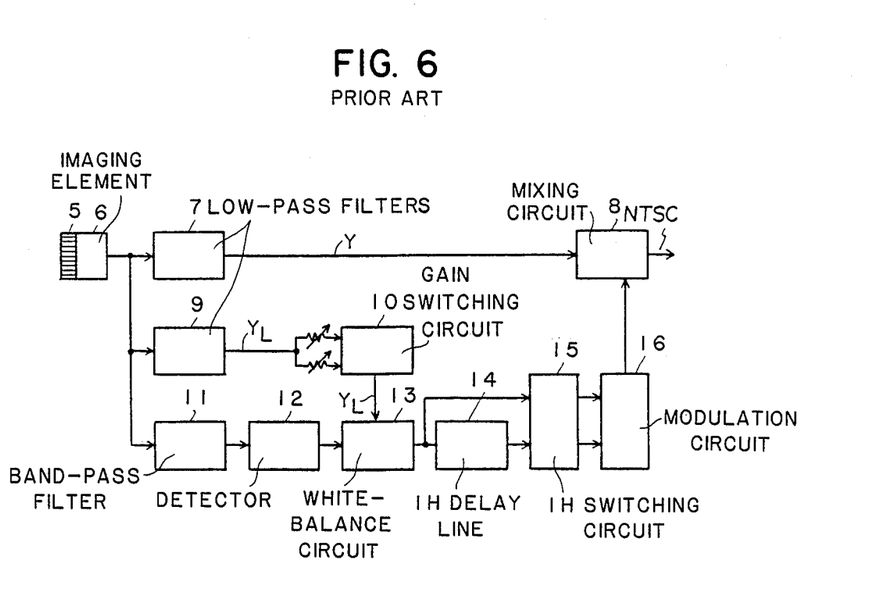
FIG. 6 is a schematic block diagram of a single-plate type color imaging device.

FIG. 6 is a schematic block diagram of the single-plate type of color imaging device. The output signal of the IL-CCD imaging element 6 is derived from the color filters, which are arrayed as stated above. The output signal is passed through a low-pass filter 7 in order to remove the modulation components and to become the luminance signal Y, which is applied to a mixing circuit 8. Besides, the output signal of the IL-CCD imaging element 6 becomes a narrow band luminance signal $Y_L$ when sent through a low-pass filter 9, having a pass band which is lower than that of the low-pass filter 7. The narrow band luminance signal is applied to a gain switching circuit 10. Further, the output signal of the IL-CCD imaging element 6 can separate the modulation components by passing them through a band-pass filter 11 having a center frequency which is a frequency corresponding to the recurrence cycle of two picture elements in the horizontal direction. The output signal of the band-pass filter 11 is detected by a detector 12 to provide color difference signals $(R-\frac{1}{2}G)$ and $(B-\frac{1}{2}G)$, which are supplied to a white balance circuit 13 which is supplied with the narrow band luminance signal from the gain switching circuit 10. The sequential color difference signal is converted into two parallel color difference signals by 1H delay line 14 and 1H switching circuit 15, and applied to a balanced modulation circuit 16 to perform a quadrature two phase modulation. The output signal from the balanced modulation circuit 16 is mixed with the luminance signal to provide the NTSC color television signal.

The IL-CCD imaging apparatus, having the color filters as shown in FIG. 3, has a disadvantage to be described below. In case of a subject having a vertical repetition frequency equal to one half of the number of the vertical picture elements, the imaging apparatus produces the output signal with a very large vertical color error. This depends upon a fact that the signal of each horizontal line is a sum of the signal charges obtained by independently and spatially sampling the two adjacent picture elements in the vertical direction, and is not constituted by a single horizontal line signal. For example, assuming that the line 11 is white, and the line 12 is black, the signal $S(l1+l2)$ is represented by the following equation.

$$S(l1+l2)=\tfrac{1}{2}B+G+\tfrac{1}{2}R+\tfrac{1}{2}(R-B)\cos wt$$

As understood from this equation, the color difference signal component is ½(R−B), which is different from the original component (R−½G), thereby to generate the vertical color error. In other words, it is inevitable to generate the vertical color error at a sharp vertical contour portion which has no vertical correlation between two adjacent horizontal picture element rows.

Figure 7:
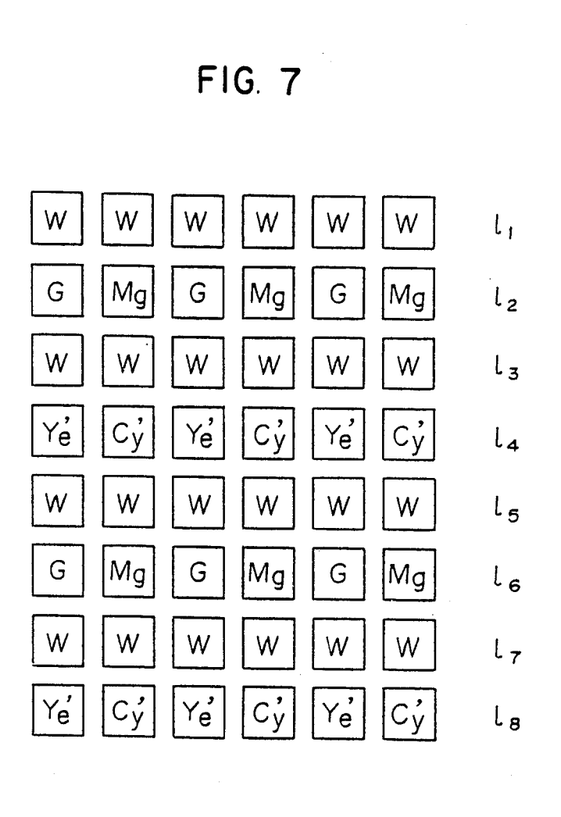
FIG. 7 is a schematic partial plan view showing the arrangement of color filters and the mutual relationships between the color filters and picture elements in accordance with a first embodiment of this invention.

FIG. 7 is a schematic partial plan view showing the arrangement of color filters and the mutual relationships between the color filters and picture elements in a first embodiment of this invention. The plurality of picture elements 1 are arranged regularly in both the horizontal direction and the vertical direction. The color filters are formed on the respective picture elements 1. The letter W indicates the color filter which is transparent. The transparent color filter transmits blue, green and red light. The letters Ye' and Cy' indicate the color filters for transmitting red and half-green light (i.e., R+½G) and blue and half-green (i.e., B+½G), respectively. The terminology "transmitting half-green light" is used here to indicate that the filter attenuates the intensity of the incident green light so that the intensity of the transmitted green light is half the intensity of the incident green light. The terms half-green, half-blue and half-red will be used throughout the specification to denote attenuated green, blue and red light, respectively. The color filters are arranged so that only the transparent filters W are arranged in the odd-numbered horizontal rows 11, 13, 15, - - - ; from the left toward the right in the horizontal direction, the green and magenta filters G and Mg are alternately and repeatedly arranged in the horizontal rows 12 and 16 - - - ; and the yellow and cyan filters Ye' and Cy' are in the rows 14 and 18.

Figure 8:
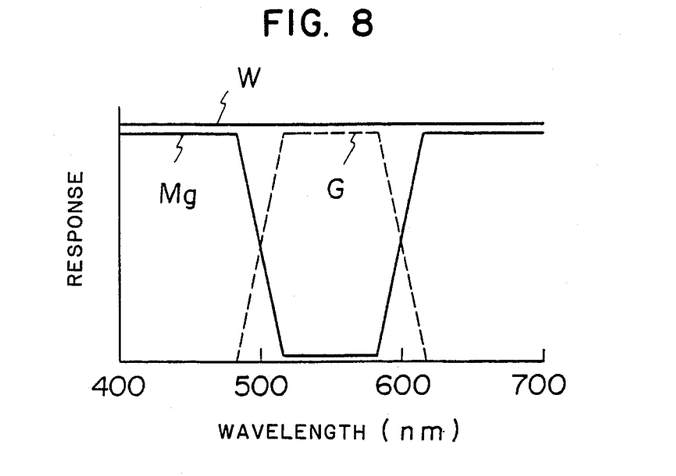
FIGS. 8 and 9 are diagrams each showing the spectral characteristics of color filters of FIG. 7.
Figure 9:
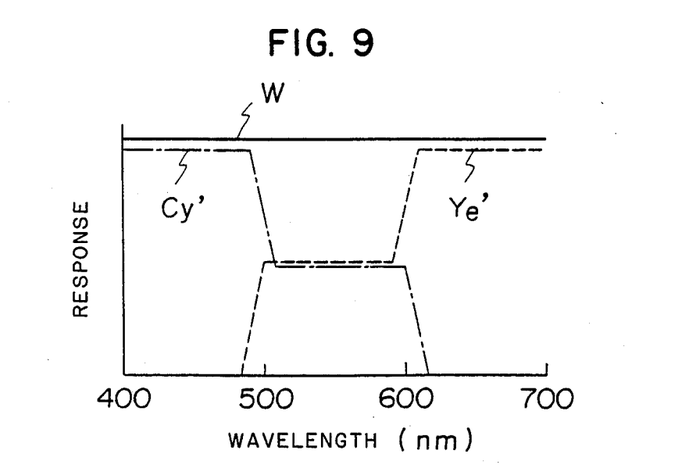

The spectral characteristics of the color filters in FIG. 7 are illustrated in FIGS. 8 and 9.

Figure 10:
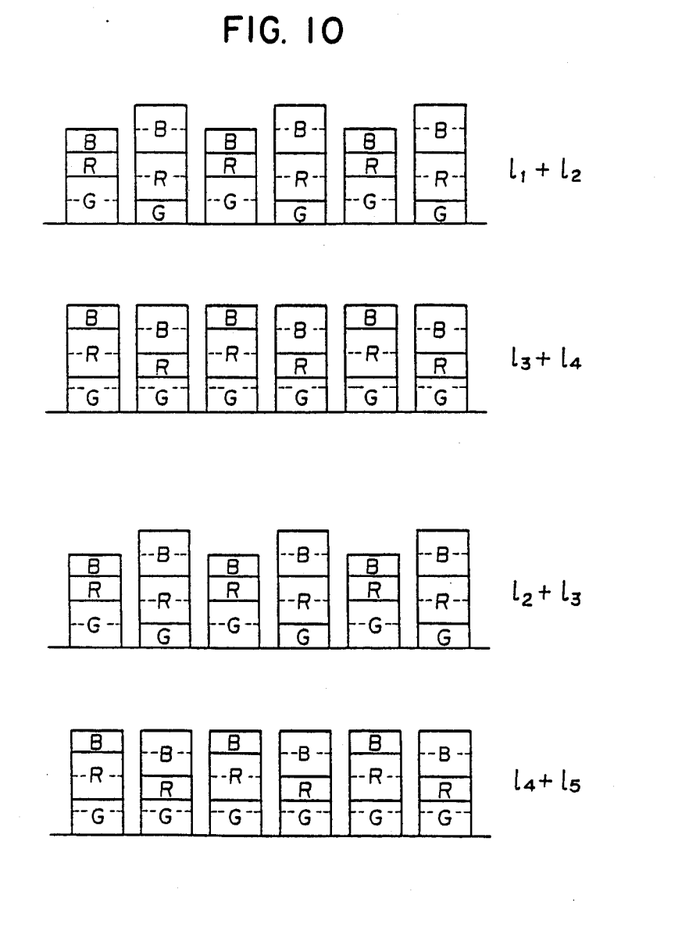
FIG. 10 is a diagram schematically showing the outputs of respective color signals from the first embodiment.

FIG. 10 is a diagram schematically showing the magnitude of the outputs of the color signals taken from the respective picture elements formed with the aforementioned color filters in the field storage which corresponds to FIG. 7. As illustrated in FIG. 10, the average value of the output signals is 3/2(B+G+R), which is used as the luminance signal. In the output signal of lines or rows 11+12, a first color difference signal component ½(R+B)−½G, i.e., ½(Mg−G) is superposed as a modulation component ½(Mg−G) cos wt, with two picture elements forming one cycle in the horizontal direction. In the output signal of lines or rows 13+14, a second color difference signal component ½(R−B) orthogonal to the (Mg−G) axis is superposed as a modulation component ½(R−B) cos wt, with two picture elements forming one cycle in the horizontal direction. Therefore, the output signals S(11+12) and S(13+14) of the lines or rows 11+12 and 13+14 are indicated by the following equations:

$$S(l1 + l2) = (2B + 2G + 2R)/2 + (B + G + R + G\cos wt - Mg\cos wt)/2$$
$$= 3/2(B + G + R) - 1/2(Mg - G)\cos wt$$
$$S(l3 + l4) = (2B + 2G + 2R)/2 + (B + G + R + R\cos wt - B\cos wt)/2$$
$$= 3/2(B + G + R) + 1/2(R - B)\cos wt$$

Figure 11:
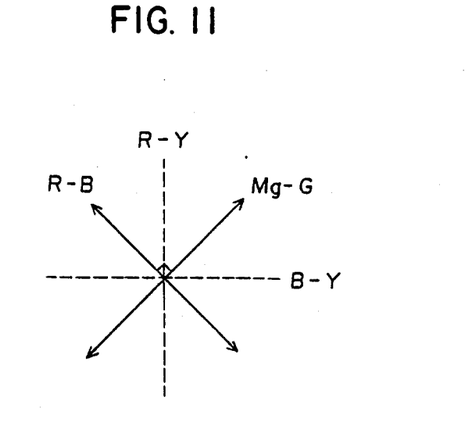
FIG. 11 is a diagram showing a color difference vector.

The NTSC color television signal can be constituted by using the base band component 3/2(B+G+R) as the luminance signal, and the modulation components ½(Mg−G) and ½(R−B) as the color difference signals orthogonal to each other as shown in FIG. 11.

In the even-numbered fields, the output signals S(12+13) and S(14+15) are indicated by the following equations:

$$S(l2+l3)=3/2(B+G+R)-\tfrac{1}{2}(Mg-G)\cos wt$$

$$S(l4+l5)=3/2(B+G+R)+\tfrac{1}{2}(R-B)\cos wt$$

The output signal from the solid-state imaging apparatus of the first embodiment can be converted to the NTSC color television signal by the apparatus shown in FIG. 6 by rotating the modulation axes in the balanced modulation circuit 16 to meet with the (Mg−G) and (R−B) axes shown in FIG. 11.

Figure 12:
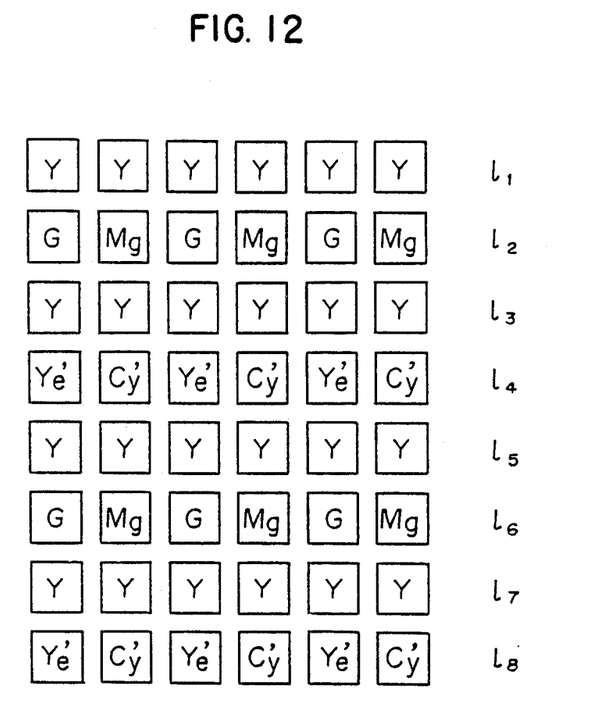
FIG. 12 is a schematic partial plan view showing the arrangement of color filters and the mutual relationships between the color filters and picture elements in accordance with a second embodiment of this invention.

A second embodiment shown in FIG. 12 is identical to the first embodiment except that the filters W for the odd-numbered rows are substituted by filters Y having a spectral characteristic close to that of the luminance signal of the NTSC color television signal, that is, for transmitting green, half-blue and half-red (G+½B+½R).

The output signals of respective horizontal scanning lines in the field storage operation are indicated by the following equations:

$$S(l1+l2)=B+3/2G+R-\tfrac{1}{2}(Mg-G)\cos wt$$

$$S(l3+l4)=B+3/2G+R+\tfrac{1}{2}(R-B)\cos wt$$

$$S(l2+l3)=B+3/2G+R-\tfrac{1}{2}(Mg-G)\cos wt$$

$$S(l4+l5)=B+3/2G+R+\tfrac{1}{2}(R-B)\cos wt$$

In the first and second embodiments, the color difference signal component is not included in one of the horizontal row (i.e., odd-numbered row), but in only the other row (i.e., even-numbered row), whereby the vertical color error is not generated in the color difference signal in the output signal even when the horizontal picture elements in the adjacent rows have no vertical correlation. Thus, the color difference signal included in the output signal from the color imaging apparatus according to this invention is formed from the single horizontal picture element row, thereby to provide the color television signal without generating the vertical color error.

What is claimed is:

1. A solid-state color imaging apparatus having color filters arrayed at a recurrence cycle of four picture elements in a vertical direction, and constructed so that in first and third rows, same-color filters for generating a same-signal component from each picture element are arrayed; in a second row, a first set of color filters for generating a first modulated color difference signal component are arrayed with a predetermined number of picture elements forming one cycle in a horizontal direction; and in a fourth row, a second set of color filters for generating a second modulated color difference signal component are arrayed with a predetermined number of picture elements forming one cycle in the horizontal direction; wherein said same-color filters of said first and third rows transmit blue, green and red light, the predetermined number of picture elements in said second row is two, and the first set of color filters comprises alternately arranged green and magenta filters.

2. The apparatus of claim 1, wherein the predetermined number of picture elements in said fourth row is two, and said second set of filters comprises alternately arranged first and second color filters, said first color filter transmitting red light and transmitting and attenuating incident green light so that the intensity of the transmitted green light is half the intensity of the incident green light, and said second filter transmitting blue light and transmitting and attenuating incident green light so that the intensity of the transmitted green light is half the intensity of the incident green light.

3. A solid-state color imaging apparatus having color filters arrayed at a recurrence cycle of four picture elements in a vertical direction, and constructed so that in first and third rows, same-color filters for generating a same-signal component from each picture element are arrayed; in a second row, a first set of color filters for generating a first color modulated color difference signal component are arrayed with a predetermined number of picture elements forming one cycle in a horizontal direction; and in a fourth row, a second set of color filters for generating a second modulated color difference signal component are arrayed with a predetermined number of picture elements forming one cycle in the horizontal direction; wherein said same-color filters of said first and third rows transmit green light and transmit and attenuate incident red and blue light so that the transmitted red and blue light is half the intensity of the incident red and blue light, respectively, thereby to approximate the spectral characteristics of the luminance signal of an NTSC color television signal.

4. The apparatus of claim 3, wherein the predetermined number of picture elements in said second row is two, and the first set of color filters comprises alternately arranged green and magenta filters.

5. The apparatus of claim 1, wherein the predetermined number of picture elements in said fourth row is two, and said second set of filters comprises alternately arranged first and second color filters, said first color filter transmitting red light and transmitting and attenuating incident green light so that the intensity of the transmitted green light is half the intensity of the incident green light, and said second filter transmitting blue light and transmitting and attenuating incident green light so that the intensity of the transmitted green light is half the intensity of the incident green light.

* * * * *